(12) United States Patent
Lin

(10) Patent No.: US 11,785,058 B2
(45) Date of Patent: Oct. 10, 2023

(54) MUSIC PLAYING METHOD AND DEVICE

(71) Applicant: YEALINK (XIAMEN) NETWORK TECHNOLOGY CO., LTD., Fujian (CN)

(72) Inventor: Yanzhang Lin, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 17/568,668

(22) Filed: Jan. 4, 2022

(65) Prior Publication Data

US 2022/0217183 A1  Jul. 7, 2022

(30) Foreign Application Priority Data

Jan. 4, 2021 (CN) .......................... 202110005221

(51) Int. Cl.
*H04L 65/1096* (2022.01)
*H04L 65/1104* (2022.01)
*H04L 65/61* (2022.01)

(52) U.S. Cl.
CPC ...... *H04L 65/1104* (2022.05); *H04L 65/1096* (2013.01); *H04L 65/61* (2022.05)

(58) Field of Classification Search
CPC . H04L 65/1104; H04L 65/61; H04L 65/1096; H04L 65/1006; H04L 65/4069
USPC .......................................................... 709/217
See application file for complete search history.

(56) References Cited

FOREIGN PATENT DOCUMENTS

| CN | 104301551 A | * | 1/2015 |
| JP | 2005277679 A | * | 10/2005 |
| JP | 2006013916 A | * | 1/2006 |

* cited by examiner

*Primary Examiner* — Glenford J Madamba

(57) ABSTRACT

Disclosed are a music playing method and device. A user device is used to control another user device, to realize a music on hold (playing music in a call-hold duration) function, which reduces interaction with a SIP server, thereby reducing load of the SIP server. Softswitch (i.e., switching SDP) is established between a second user device in need of the music on hold function and a media resource server by a first user device, to realize a P2P media link between the second user device and the media resource server, which saves broadband resources of the SIP server. Also, in a situation where the media resource server needs to be deployed in another network segment (i.e., the media resource server and the second user device are in two network segments), the P2P media link can avoid configuring an access permission to a router, thus being convenient for network environment deployment.

5 Claims, 5 Drawing Sheets

MUSIC PLAYING METHOD AND DEVICE

CROSS-REFERENCE TO RELATED APPLICATIONS

The present application claims the benefit of Chinese Patent Application No. 202110005221.8 filed on Jan. 4, 2021 the contents of which are hereby incorporated by reference.

TECHNICAL FIELD

The present disclosure relates to the field of communication technologies, and in particular, to a music playing method and device.

BACKGROUND ART

A session initial protocol (SIP) is a signaling protocol used for initiating, modifying, and terminating sessions between one or more participants, and is also responsible for transmitting session description protocol (SDP) packets. The SDP packets include related media information used in the sessions, such as IP addresses, media ports, media directions, media codec information, and information of invitees. After the invitees are informed via their respective terminal devices, a real-time streaming protocol (RTSP) may be used to control communication of particular media content. For example, if RTSP control information indicates playing a video, real-time data is transferred by a real-time transport protocol (RTP).

At present, transmission and reception of media streams are generally terminated when a voice over Internet protocol (VoIP) call is placed on hold. Thus, a party who has been placed on hold simply hears silence, which causes poor user experience. In recent years, some SIP servers have been developed to support a music on hold (playing music in a call-hold duration) function, which features as: during a process of establishing a call between a first user device and the second user device via a SIP server, after the first user device places the second user device on hold, the SIP server directly transmits locally stored music sound to the second user device, so as to allow the second user device to hear the music sound, thereby enhancing user experience.

However, this requires the SIP servers to support the music on hold function, which increases load of the SIP servers.

SUMMARY

An objective of the present disclosure is to provide a music playing method and device, aiming to solve the problem in the related art that playing music to a user device in a call-hold duration occupies resources of the SIP server and thereby increases load the SIP server.

To achieve the above objective, the present disclosure provides the following technical solutions.

According to a first aspect, the present disclosure provides a music playing method, applied to a network including a SIP server, a media resource server, and a plurality of user devices. During a call between a first user device and a second user device, the playing method includes:

obtaining, by the first user device, first media information of the media resource server, in response to that the first user device receives a call hold trigger signal;

transmitting, by the first user device, a call hold request message carrying the first media information to the SIP server according to the call hold trigger signal, to allow the SIP server to forward the first media information to the second user device;

transmitting, by the first user device, obtained second media information of the second user device to the media resource server; and transmitting, by the first user device, a music start notification message to the media resource server, the music start notification message being configured for instructing the media resource server to transmit an audio data stream to the second user device.

Optionally, the operation of obtaining, by the first user device, first media information of the media resource server includes:

initiating, by the first user device, a call to the media resource server; and obtaining, by the first user device, the first media information of the media resource server according to a successful connection acknowledgment message transmitted by the media resource server.

Optionally, before the operation of transmitting, by the first user device, obtained second media information of the second user device to the media resource server, the playing method further includes:

receiving, by the first user device, an accept call hold response message that is transmitted by the second user device and then forwarded by the SIP server; and obtaining, by the first user device, the second media information of the second user device according to the accept call hold response message.

Optionally, after the operation of transmitting, by the first user device, a music start notification message to the media resource server, the playing method further includes:

transmitting, by the first user device, a music end notification message to the media resource server, in response to that the first user device receives a cancel call hold trigger signal, the music end notification message being configured for instructing the media resource server to stop transmitting the audio data stream to the second user device.

According to a second aspect, the present disclosure provides a music playing method, applied to a network including a SIP server, a media resource server, and a plurality of user devices. During a call between a first user device and a second user device, the playing method includes:

transmitting, by the media resource server, a successful connection acknowledgment message to the first user device, in response to that the media resource server receives a call from the first user device, the successful connection acknowledgment message carrying first media information of the media resource server;

receiving, by the media resource server, second media information of the second user device transmitted by the first user device; and transmitting, by the media resource server, an audio data stream to the second user device, in response to that the media resource server receives a music start notification message transmitted by the first user device.

Optionally, after the operation of transmitting, by the media resource server, an audio data stream to the second user device, the music playing method further includes:

stopping, by the media resource server, transmitting the audio data stream to the second user device, in response to that the media resource server receives a music end notification message transmitted by the first user device.

According to a third aspect, the present disclosure provides a terminal, applied to a network including a SIP server, a media resource server, the terminal, and at least one user device. During a call between the terminal and the at least one user device, the terminal includes:

- an obtaining module, configured to obtain first media information of the media resource server, in response to that the terminal receives a call hold trigger signal;
- a first transmitting module, configured to transmit a call hold request message carrying the first media information to the SIP server according to the call hold trigger signal, to allow the SIP server to forward the first media information to the at least one user device;
- a second transmitting module, configured to transmit obtained second media information of the at least one user device to the media resource server; and
- a playing notification module, configured to transmit a music start notification message to the media resource server, the music start notification message being configured for instructing the media resource server to transmit an audio data stream to the at least one user device.

Optionally, the obtaining module includes:
- a call sub-module, configured to initiate a call to the media resource server; and
- a first obtaining sub-module, configured to obtain the first media information of the media resource server according to a received successful connection acknowledgment message transmitted by the media resource server.

Optionally, the second transmitting module is further configured to:
- receive an accept call hold response message that is transmitted by the at least one user device and then forwarded by the SIP server; and
- obtain the second media information of the at least one user device according to the accept call hold response message.

According to a fourth aspect, the present disclosure provides a media resource server, applied to a network including a SIP server, the media resource server, and a plurality of user devices. During a call between a first user device and a second user device, the media resource server includes:

- a third transmitting module, configured to transmit a successful connection acknowledgment message to a first user device, in response to that the media resource server receives a call from the first user device, the successful connection acknowledgment message carrying first media information of the media resource server;
- a receiving module, configured to receive second media information of a second user device transmitted by the first user device; and
- an audio transmitting module, configured to transmit an audio data stream to the second user device, in response to that the media resource server receives a music start notification message transmitted by the first user device.

Compared to the related art, the music playing method and device provided by the present disclosure have at least the following beneficial effects.

1. In the related art, the SIP server is needed to implement the music on hold function. That is, the SIP server is responsible for controlling the music playing function (for example, the SIP server directly stores an audio data stream or instructs the user device to obtain an audio data stream) in the call-hold duration, which increases load of the SIP server. In contrast, the present disclosure uses a user device to control another user device, to realize the music on hold function, which reduces interaction with the SIP server, thereby reducing load of the SIP server.

2. In the present disclosure, softswitch (i.e., switching SDP information) is established between the second user device in need of the music on hold function and the media resource server by the first user device, so as to establish a peer-to-peer (P2P) media link between the second user device and the media resource server, which saves network broadband resources of the SIP server. In addition, in a situation where the media resource server needs to be deployed in another network segment (i.e., the media resource server and the second user device are in two different network segments), the P2P media link can avoid configuring an access permission to a router, which is convenient for network environment deployment.

The additional aspects and advantages of the present disclosure will be described in the following description, some of which will become obvious from the following description, or be understood through the practice of the present disclosure.

BRIEF DESCRIPTION OF THE DRAWINGS

The present disclosure is further described below with reference to the drawings and embodiments.

REFERENCE NUMERALS

Figure 1:
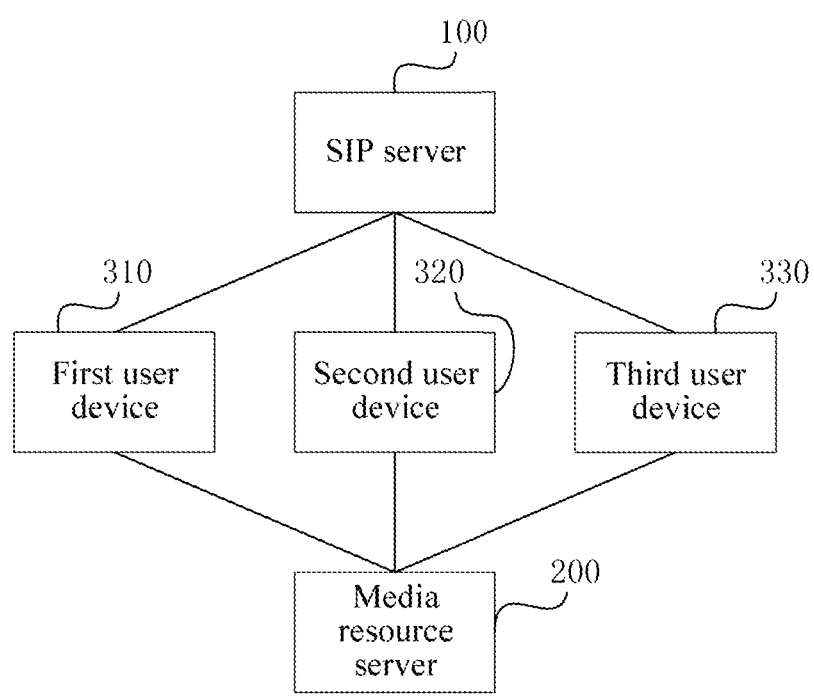
FIG. 1 is a diagram showing an application environment of a music playing method according to an embodiment.

100, SIP server; 200, media resource server; 210, third transmitting module; 220, receiving module; 230, audio transmitting module; 310, first user device; 311, obtaining module; 312, first transmitting module; 313, second transmitting module; 314, playing notification module; 320, second user device; 330, third user device.

DETAILED DESCRIPTION OF THE EMBODIMENTS

This section will describe specific embodiments of the present disclosure in detail. Preferred embodiments of the present disclosure are shown in the drawings, which are used to supplement text in the description with graphics, so as to make each technical feature and overall technical solution of the present disclosure easier to understand. These drawings should not be interpreted as a limitation on the protection scope of the present disclosure.

FIG. 1 is a diagram showing an application environment of a music playing method according to an embodiment. As shown in FIG. 1, a SIP server 100, a media resource server 200, and a plurality of terminals (including a first user device 310, a second user device 320, and a third user device 330) communicate with one other to form a network.

Figure 5:
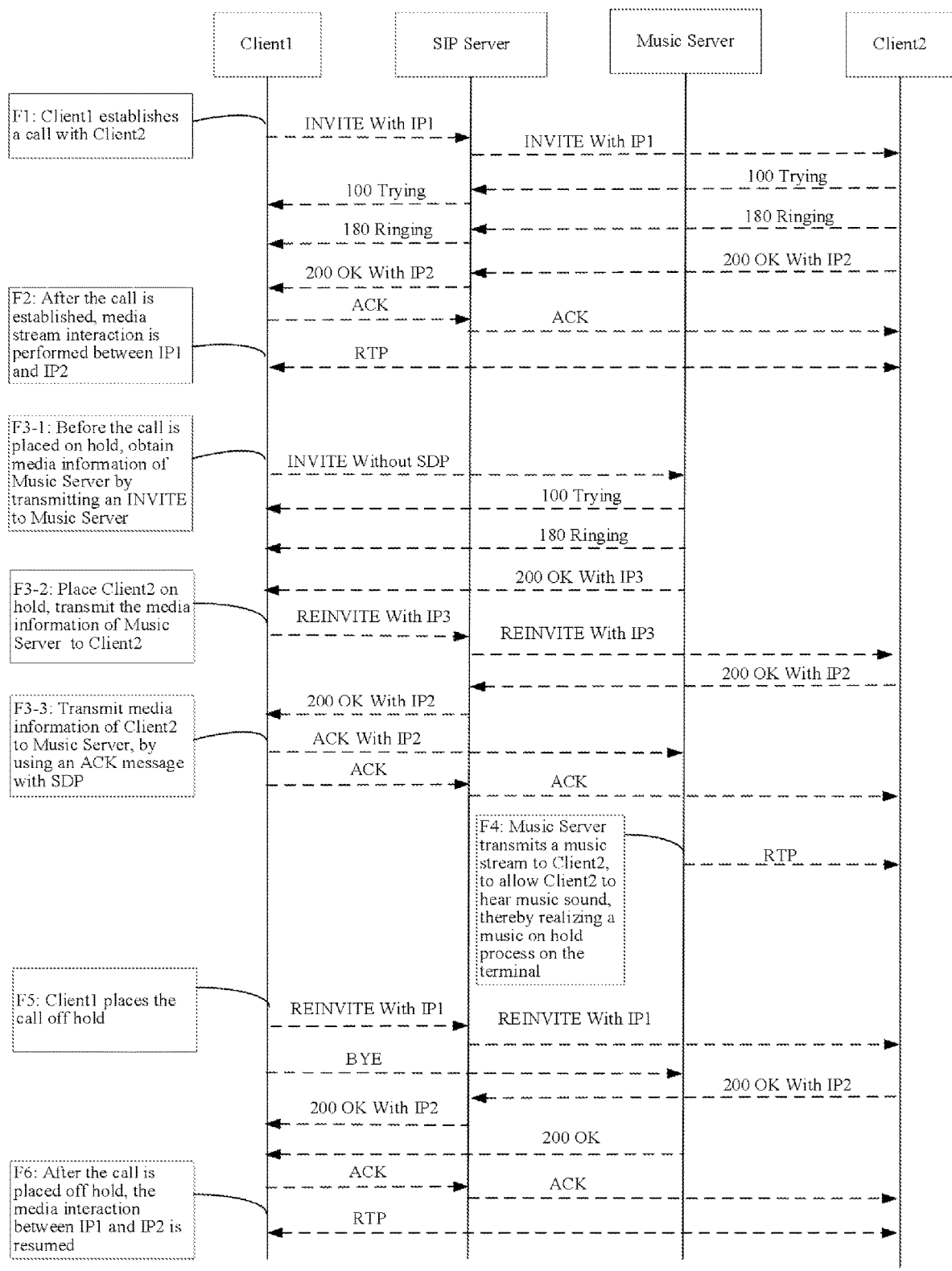
FIG. 5 is a signaling diagram of a music playing method according to an embodiment.

FIG. 5 is a signaling diagram of a music playing method according to an embodiment. As an aid to understanding, relevant terms in the SIP protocol shown in FIG. 5 are described in TABLE 1.

TABLE 1

Relevant terms in the SIP protocol:

SDP: a body format in an INVITE/200 OK/ACK signaling, generally used to store related media information, such as an IP address, a media port, a media direction, and media codec information
Media direction: sendrecv (receive and send media), sendonly (hold, only send and not receive media), recvonly (held, only receive and not send media)
INVITE: a call signaling, used by a terminal/server to initiate a call
200 OK: a response signaling, generally used to inform a peer that the response is normal
ACK: reconfirmation of 200 OK response, to realize two-factor authentication
REINVITE: an INVITE having the same Call-ID, From-Tag and To-Tag based on an existing INVITE session, which is the same call for a caller and a callee
BYE: a signaling for hanging up a call In FIG. 5, Client1 is a first user device 310 whose IP address is IP1, Client2 is a second user device 320 whose IP address is IP2, Music Server is a media resource server 200 whose IP address is IP3, and SIP Server is a SIP server 100. Music Server and SIP Server may be the same one or different ones.

As shown in FIG. 5:

F1: Client1 and Client2 are both registered on the same SIP Server, and Client1 establishes a call with Client2. A specific process is: when Client1 attempts to establish a call with Client2, Client1 transmits a call request message to SIP Server, to allow SIP Server to forward the call request message to Client2. Subsequently, Client2 returns a 180-ringing message to SIP Server, to allow SIP Server to forward the 180-ringing message to Client1. Then, Client2 returns a 200 OK (success) message to SIP Server, to allow SIP Server to forward the 200 OK message to Client1. Subsequently, Client1 transmits an ACK (acknowledgement) message to SIP Server, to allow SIP Server to forward the ACK message to Client2.

F2: After Client1 establishes the call with Client2, media streams are directly transmitted between the IP1 and the IP2. Based on the above process, the SIP server 100 establishes the call between the first user device 310 and the second user device 320. The first user device 310 and the second user device 320 transmit RTP data streams via the SIP server 100.

Figure 4:
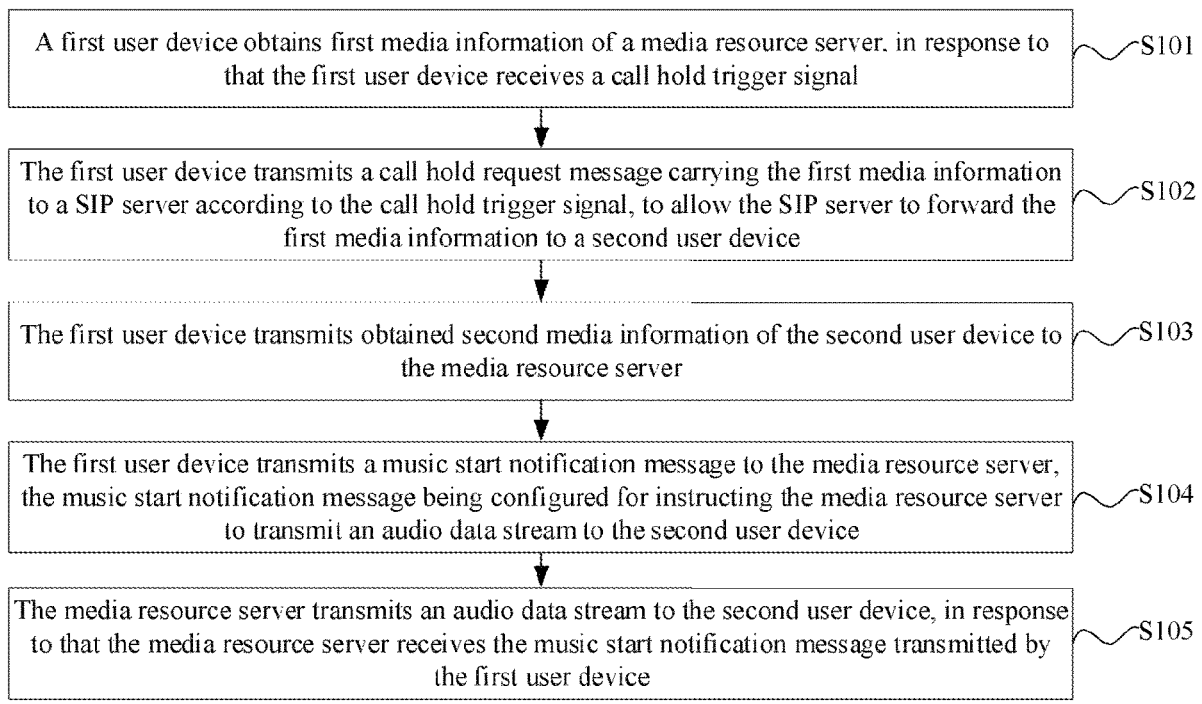
FIG. 4 is a flowchart of a music playing method according to an embodiment.

Based on the above application scenario, during the call between the first user device 310 and the second user device 320, as shown in FIG. 4, the music playing method may include step S101 to step S105. More specifically, as shown in FIG. 5, step S101 to step S105 may specifically include F3 to F6.

With reference to FIG. 4 and FIG. 5, a music playing method according to an embodiment of the present disclosure is specifically described below.

Step S101. The first user device 310 obtains first media information of the media resource server, in response to that the first user device 310 receives a call hold trigger signal.

During the call between the first user device 310 and the second user device 320, if the first user device 310 wants to initiate another call, for example, the first user device 310 wants to establish a new call with the third user device 330, but also wants to place the call with the second user device 320 on line and resume the call with the second user device 320 after the call with the third user device 330 is ended, the first user device 310 transmits a call hold request message to the SIP server 100. After the SIP server 100 receives the call hold request message from the first user device 310, the SIP server 100 provides a call hold service for the call between the first user device 310 and the second user device 320. That is, the SIP server 100 does not hang up the call between the first user device 310 and the second user device 320.

In an embodiment, the first user device 310 is a mobile terminal. The call hold trigger signal is generated on the mobile terminal by a user pressing a button on the mobile terminal. When the first user device 310 receives the call hold trigger signal, the following operations are performed:

Step S1011. The first user device 310 initiates a call to the media resource server.

Step S1012. The first user device 310 obtains the first media information of the media resource server according to a received successful connection acknowledgment message transmitted by the media resource server.

When the media resource server receives the call from the first user device 310, the media resource server transmits the successful connection acknowledgment message to the first user device 310. The successful connection acknowledgment message carries the first media information of the media resource server.

Specifically, in the step F3-1 as shown in FIG. 5: before Client1 places Client2 on hold, Client1 transmits an INVITE message without SDP to Music Server. Subsequently, Music Server replies a 200 OK message (i.e., the successful connection acknowledgment message transmitted by the media resource server), SDP in which carries information such as the IP3 and a media port, so as to allow Client1 to obtain the media information of Music Server. The first media information is media information stored in the SDP which is carried in the successful connection acknowledgment message transmitted by the media resource server.

Step S102. The first user device 310 transmits a call hold request message carrying the first media information to the SIP server 100 according to the call hold trigger signal, to allow the SIP server 100 to forward the first media information to the second user device 320.

Specifically, in the step F3-2 as shown in FIG. 5: Client1 transmits a REINVITE message (i.e., the call hold request message) to Client2. SDP in the REINVITE message carries media address information (the IP3 and the media port) of Music Server, and also marks a media direction as sendonly. Subsequently, Client2 replies a 200 OK message. SDP in the 200 OK message carries information such as the IP2 and a media port, and marks a media direction as recvonly.

Step S103. The first user device 310 transmits obtained second media information of the second user device 320 to the media resource server, and the media resource server receives the second media information of the second user device 320 transmitted by the first user device 310.

Before the first user device 310 transmits the obtained second media information of the second user device 320 to the media resource server, the method further includes:

the first user device 310 receives an accept call hold response message that is transmitted by the second user device 320 and then forwarded by the SIP server 100; and the first user device 310 obtains the second media information of the second user device 320 according to the accept call hold response message.

Specifically, in the step F3-3 as shown in FIG. 5: Client1 transmits an ACK message to Music Server after receiving the 200 OK message (i.e., the accept call hold response message) from Client2. SDP in the ACK message carries media address information of Client2, and marks a media direction as recvonly. Client1 transmits an ACK message to Client2. This ACK message carries no SDP information. The second media information is media information stored in the SDP which is carried in the accept call hold response message transmitted by the second user device 320.

Step S104. The first user device 310 transmits a music start notification message to the media resource server. The music start notification message is used for instructing the media resource server to transmit an audio data stream to the second user device 320.

Step S105. The media resource server transmits an audio data stream to the second user device 320, in response to that the media resource server receives the music start notification message transmitted by the first user device 310.

Specifically, in the step F3-3 as shown in FIG. 5: the SDP softswitch has been realized between Music Server and Client2 by the bridging of Client1. At this stage, Client2 is in a hold state, and at the same time receives a music sound transmitted by Music Server. As such, Client1 completes a music on hold process.

Through step S101 to step S105, the SDP softswitch has been realized between the media resource server 200 and the second user device 320 by the first user device 310. This is convenient for the media resource server 200 and the second user device 320 to obtain the other party's address information and verify the other party's identity, so as to realize the P2P media link.

Step S106. The first user device 310 transmits a music end notification message to the media resource server, in response to that the first user device 310 receives a cancel call hold trigger signal. The music end notification message is used for instructing the media resource server to stop transmitting the audio data stream to the second user device 320.

Correspondingly, the media resource server stops transmitting the audio data stream to the second user device 320, in response to that the media resource server receives the music end notification message transmitted by the first user device 310.

Specifically, in the step F3-3 as shown in FIG. 5: when Client1 wants to place the call off hold, Client1 transmits a REINVITE message to Client2. SDP information carries the IP1 and media information, and a media direction is sendrecv. After Client2 receives the REINVITE message, Client2 resumes the media interaction with Client1 and exits the hold state. At the same time, Client1 transmits a BYE message to Music Server. Accordingly, Music Server stops transmitting music media to Client2. As such, Client1 completes a unhold process.

In the related art, the SIP server 100 is needed to implement the music on hold function. That is, the SIP server 100 is responsible for controlling the music playing function (for example, the SIP server 100 directly stores an audio data stream or instructs the user device to obtain an audio data stream) in the call-hold duration, which increases load of the SIP server 100. In contrast, the present disclosure uses a user device to control another user device, to realize the music on hold function, which reduces interaction with the SIP server 100, thereby reducing load of the SIP server 100. In the present disclosure, the softswitch (i.e., switching SDP information) is established between the second user device 320 in need of the music on hold function and the media resource server by the first user device 310, so as to establish the P2P media link between the second user device 320 and the media resource server, which saves network broadband resources of the SIP server 100. Besides, in a situation where the media resource server needs to be deployed in another network segment (i.e., the media resource server and the second user device 320 are in two different network segments), the P2P media link can avoid configuring an access permission to a router, which is convenient for network environment deployment.

Figure 2:
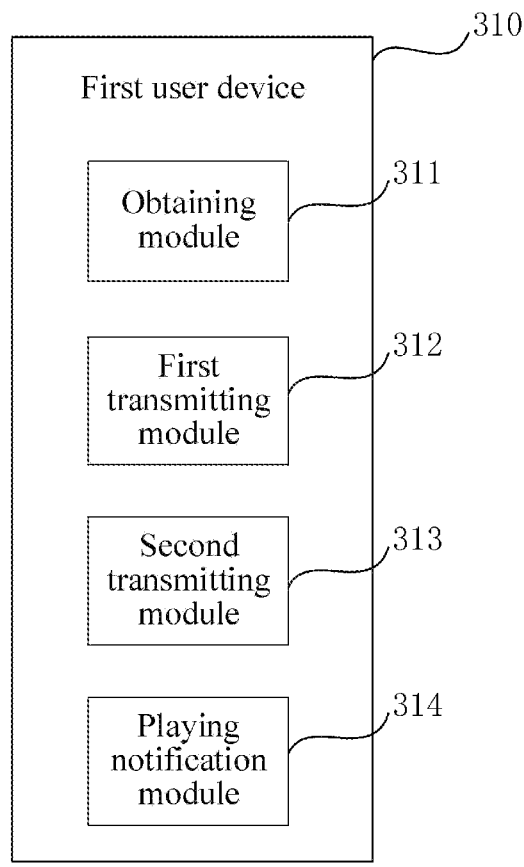
FIG. 2 is a block diagram of a terminal according to an embodiment.

According to another aspect, an embodiment of the present disclosure provides a terminal, applied to a network including a SIP server 100, a media resource server, the terminal, and at least one user device. During a call between the terminal and the at least one user device, as shown in FIG. 2, in an embodiment, the terminal is the first user device 310. The first user device 310 includes an obtaining module 311, a first transmitting module 312, a second transmitting module 313, and a playing notification module 314.

The obtaining module 311 is configured to obtain first media information of the media resource server, when the terminal receives a call hold trigger signal.

The first transmitting module 312 is configured to transmit a call hold request message carrying the first media information to the SIP server 100 according to the call hold trigger signal, to allow the SIP server 100 to forward the first media information to a second user device 320.

The second transmitting module 313 is configured to transmit obtained second media information of the second user device 320 to the media resource server.

The playing notification module 314 is configured to transmit a music start notification message to the media resource server. The music start notification message is used for instructing the media resource server to transmit an audio data stream to the second user device 320.

Optionally, the obtaining module 311 includes a call sub-module and a first obtaining sub-module.

The call sub-module is configured to initiate a call to the media resource server.

The first obtaining sub-module is configured to obtain the first media information of the media resource server according to a received successful connection acknowledgment message transmitted by the media resource server.

Optionally, the second transmitting module 313 is further configured to:
receive an accept call hold response message that is transmitted by the second user device 320 and then forwarded by the SIP server 100; and
obtain the second media information of the second user device 320 according to the accept call hold response message.

In another embodiment, the terminal includes: a processor. The processor is configured to perform the foregoing modules stored in a memory, including: the obtaining module 311, the first transmitting module 312, the second transmitting module 313, the playing notification module 314, the call sub-module, and the first obtaining sub-module.

The terminal embodiments provided by the present disclosure are based on the same inventive concept as the foregoing method embodiments, thus are not be detailed here.

Figure 3:
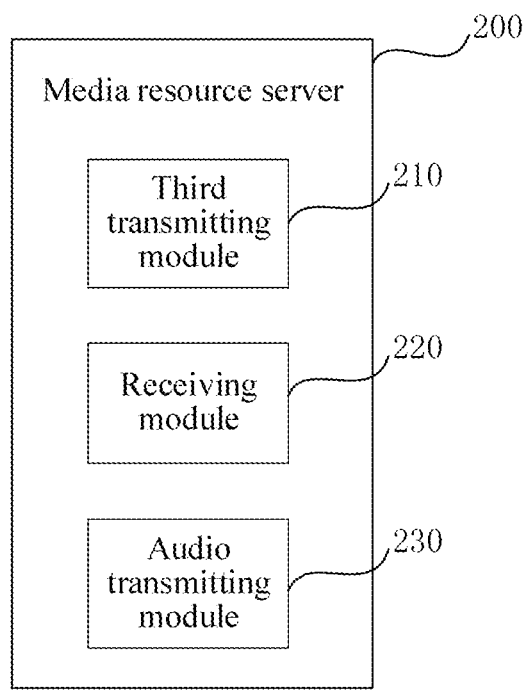
FIG. 3 is a block diagram of a media resource server according to an embodiment.

According to another aspect, as shown in FIG. 3, an embodiment of the present disclosure provides a media resource server, applied to a network including a SIP server 100, the media resource server, and a plurality of user devices. During a call between a first user device 310 and a second user device 320, the media resource server includes a third transmitting module 210, a receiving module 220, and an audio transmitting module 230.

The third transmitting module 210 is configured to transmit a successful connection acknowledgment message to the first user device 310, when the media resource server receives a call from the first user device 310. The successful connection acknowledgment message carries first media information of the media resource server.

The receiving module 220 is configured to receive second media information of the second user device 320 transmitted by the first user device 310.

The audio transmitting module 230 is configured to transmit an audio data stream to the second user device 320, when the media resource server receives a music start notification message transmitted by the first user device 310.

The media resource server embodiments provided by the present disclosure are based on the same inventive concept as the foregoing method embodiments, thus are not be detailed here.

In another embodiment, the media resource server includes: a processor. The processor is configured to perform the foregoing modules stored in a memory, including: the third transmitting module 210, the receiving module 220, and the audio transmitting module 230.

Figure 6:
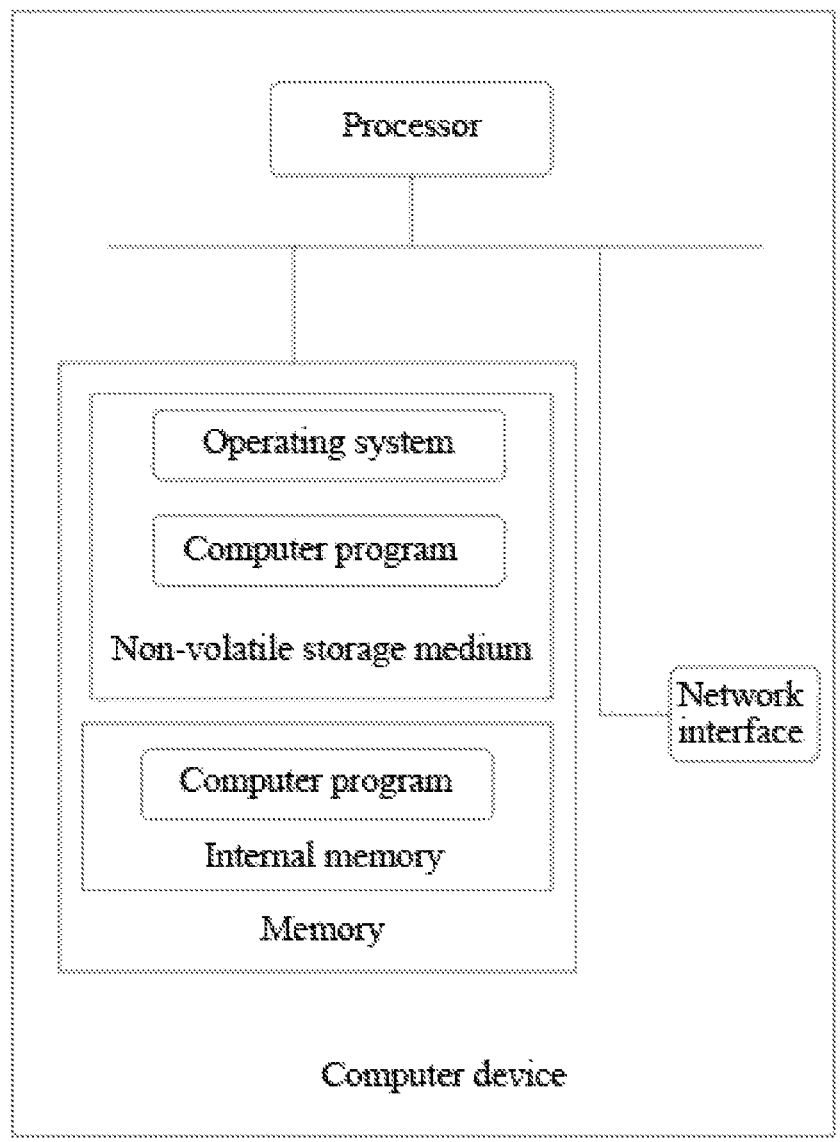
FIG. 6 is a block diagram of a computer device according to an embodiment.

FIG. 6 shows an internal structure diagram of a computer device according to an embodiment. The computer device may specifically be the terminal (or the server) in FIG. 1. As shown in FIG. 6, the computer device includes a processor, a memory, a network interface, an input apparatus, and a display screen connected via a system bus. The memory includes a non-volatile storage medium and an internal memory. The non-volatile storage medium of the computer device stores an operating system and may also store a computer program. The computer program, when being executed by a processor, causes the processor to perform the music playing method. The internal memory may also store the computer program. The computer program, when being executed by a processor, causes the processor to perform the music playing method. It will be appreciated that FIG. 6 merely shows a block diagram of part structures related to the solution of the present disclosure, which does not constitute a limitation on the computer device to which the solution of the present disclosure is applied. A specific computer device may include more or fewer components than shown in the figure, or have certain components combined, or have a different component arrangement.

It will be appreciated that all or part of the operations in the foregoing method embodiments may be implemented by a computer program instructing relevant hardware. The program may be stored in a non-volatile computer-readable storage medium. The program, when being executed, may include the operations in the foregoing method embodiments. Any memory, storage, database or other media mentioned in the embodiments of the present disclosure may include a non-volatile memory and/or a volatile memory. The non-volatile memory may include a read-only memory (ROM), a programmable read-only memory (PROM), an electrically PROM (EPROM), an erasable PROM (EEPROM), or a flash memory. The volatile memory may include a random-access memory (RAM) or an external cache. The RAM may have various forms, including but not limited to, a static RAM (SRAM), a dynamic RAM (DRAM), a synchronous DRAM (SDRAM), a double data rate DRAM (DDRSDRAM), an enhanced SDRAM (ESDRAM), a synchlink DRAM (SLDRA), a rambus direct RAM (RDRA), a direct rambus dynamic RAM (DRDRAM), and a rambus dynamic RAM (RDRAM), etc.

The technical features of the above embodiments may be combined arbitrarily. For the sake of brevity, the above embodiments do not describe all possible combinations of the technical features. However, any combinations of the technical features that are not contradictory should be considered within the scope of the present disclosure.

What is claimed is:

1. A music playing method, applied to a network comprising a session initial protocol (SIP) server, a media resource server, and a plurality of user devices, wherein during a call between a first user device and a second user device, the playing method comprises:

obtaining, by the first user device, first media information of the media resource server, in response to that the first user device receives a call hold trigger signal;

transmitting, by the first user device, a call hold request message carrying the first media information to the SIP server according to the call hold trigger signal, to allow the SIP server to forward the first media information to the second user device;

receiving, by the first user device, an accept call hold response message that is transmitted by the second user device and then forwarded by the SIP server;

obtaining, by the first user device, second media information of the second user device according to the accept call hold response message;

transmitting, by the first user device, the obtained second media information of the second user device to the media resource server to establish a peer-to-peer (P2P) media link between the second user device and the media resource server; and transmitting, by the first user device, a music start notification message to the media resource server, the music start notification message being configured for instructing the media resource server to transmit an audio data stream to the second user device;

wherein the operation of obtaining, by the first user device, first media information of the media resource server comprises:

initiating, by the first user device, a call to the media resource server; and obtaining, by the first user device, the first media information of the media resource server according to a successful connection acknowledgment message transmitted to the first user device by the media resource server.

2. The music playing method according to claim 1, wherein after the operation of transmitting, by the first user device, a music start notification message to the media resource server, the playing method further comprises:

transmitting, by the first user device, a music end notification message to the media resource server, in response to that the first user device receives a cancel call hold trigger signal, the music end notification message being configured for instructing the media resource server to stop transmitting the audio data stream to the second user device.

3. A music playing method according to claim 1, applied to a network comprising a SIP server, a media resource server, and a plurality of user devices, wherein during a call between a first user device and a second user device, the playing method further comprises:

transmitting, by the media resource server, a successful connection acknowledgment message to the first user device, in response to that the media resource server receives a call from the first user device, the successful connection acknowledgment message carrying first media information of the media resource server;

receiving, by the media resource server, second media information of the second user device transmitted by the first user device; and transmitting, by the media resource server, an audio data stream to the second user device, in response to that the media resource server receives a music start notification message transmitted by the first user device.

4. The music playing method according to claim 3, wherein after the operation of transmitting, by the media resource server, an audio data stream to the second user device, the music playing method further comprises:

stopping, by the media resource server, transmitting the audio data stream to the second user device, in response to that the media resource server receives a music end notification message transmitted by the first user device.

5. A terminal, applied to a network comprising a SIP server, a media resource server, the terminal, and at least one user device, wherein during a call between the terminal and the at least one user device, the terminal comprises:

an obtaining module, configured to obtain first media information of the media resource server, in response to that the terminal receives a call hold trigger signal;

a first transmitting module, configured to transmit a call hold request message carrying the first media information to the SIP server according to the call hold trigger signal, to allow the SIP server to forward the first media information to the at least one user device;

a second transmitting module, configured to receive an accept call hold response message that is transmitted by the at least one user device and then forwarded by the SIP server;

the second transmitting module, configured to obtain second media information of the at least one user device according to the accept call hold response message;

the second transmitting module, configured to transmit the obtained second media information of the at least one user device to the media resource server to establish a P2P media link between the second user device and the media resource server; and a playing notification module, configured to transmit a music start notification message to the media resource server, the music start notification message being configured for instructing the media resource server to transmit an audio data stream to the at least one user device;

wherein the obtaining module comprises:

a call sub-module, configured to initiate a call to the media resource server; and a first obtaining sub-module, configured to obtain the first media information of the media resource server according to a received successful connection acknowledgment message transmitted to the first user device by the media resource server.

* * * * *